(12) United States Patent
Nicholson et al.

(10) Patent No.: US 10,741,209 B2
(45) Date of Patent: Aug. 11, 2020

(54) SYSTEMS AND METHODS FOR PROTECTING HARD DISK DRIVES

(75) Inventors: John W. Nicholson, Holly Springs, NC (US); Jeffrey R. Hobbet, Holly Springs, NC (US); Philip J. Jakes, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 546 days.

(21) Appl. No.: 12/789,751

(22) Filed: May 28, 2010

(65) Prior Publication Data

US 2011/0292540 A1 Dec. 1, 2011

(51) Int. Cl.
*G11B 19/04* (2006.01)
*G11B 5/55* (2006.01)

(52) U.S. Cl.
CPC .......... *G11B 19/042* (2013.01); *G11B 5/5582* (2013.01)

(58) Field of Classification Search
CPC .... G11B 19/041; G11B 19/042; G11B 5/5582
See application file for complete search history.

(56) References Cited

U.S. PATENT DOCUMENTS

| | | | |
|---|---|---|---|
| 5,303,171 A * | 4/1994 | Belt et al. | 713/321 |
| 7,310,196 B1 * | 12/2007 | Schreck et al. | 360/75 |
| 7,480,813 B2 * | 1/2009 | Asoh et al. | 713/324 |
| 7,620,830 B2 * | 11/2009 | Adams et al. | 713/323 |
| 7,751,142 B2 * | 7/2010 | Karakas | 360/75 |
| 8,023,262 B2 * | 9/2011 | Ligtenberg et al. | 361/679.55 |
| 2007/0113286 A1 * | 5/2007 | Cromer et al. | 726/26 |
| 2010/0046343 A1 * | 2/2010 | Tsai | 369/75.11 |

* cited by examiner

*Primary Examiner* — Andrew L Sniezek
(74) *Attorney, Agent, or Firm* — Ference & Associates LLC

(57) ABSTRACT

A modified hard disk drive (HDD) state is provided. The modified HDD state corresponds to a state wherein the heads of a hard disk drive assembly are parked as a baseline setting, but permitted to float over the platters for completing requests on a limited basis. This prioritizes HHD protection in certain contexts.

7 Claims, 3 Drawing Sheets

SYSTEMS AND METHODS FOR PROTECTING HARD DISK DRIVES

BACKGROUND

The subject matter presented herein generally relates to preventing damage to components of electronic devices. More specifically, the subject matter presented herein relates to protection of hard drives.

Electronic devices are relatively sensitive to sudden impacts, such as a result of the device being inadvertently dropped onto the floor by a user. Such impacts can cause damage to the components of the device, including components of a hard disk drive (HDD) assembly. Such damage can result from the impact because a head may not be parked, that is away from a platter of the HDD, when the impact occurs. This can lead to the head "slapping" the platter of the HDD, causing damage as a result of the impact.

Certain adaptive solutions have been implemented as mechanisms for dealing with such sudden or unexpected impacts. For example, an existing solution includes an integrated motion sensor that monitors the movement of a notebook computer, and, responsive to a detection of a sudden change in acceleration, correlated with an impending impact, temporarily stops the HDD to protect it. Thus, such acceleration-based solutions can detect sudden changes in acceleration and temporarily stop the HDD to help protect valuable data from some impacts that occur.

BRIEF SUMMARY

In summary, one aspect provides an apparatus comprising: one or more processors; a display which displays output generated by the one or more processors; and a hard disk drive assembly operatively connected to the one or more processors, the hard disk drive assembly comprising: one or more platters; one or more heads configured to read and write data from the one or more platters; and a drive controller configured to control said hard disk drive assembly; wherein, responsive to an indicator, the one or more heads are configured to be placed in a persist unload heads state in which the one or more heads: temporarily park; and perform one of limited reading and limited writing of buffered requests responsive to one or more predetermined conditions.

Another aspect provides a method comprising: controlling, responsive to receipt of an indicator, a hard disk drive assembly of an apparatus, the hard disk drive assembly including one or more heads and one or more platters, said controlling comprising: placing the one or more heads in a persist unload heads state in which the one or more heads: temporarily park; and perform one of limited reading and limited writing of buffered requests responsive to one or more predetermined conditions.

A further aspect provides a computer program product comprising: a computer readable storage medium having computer readable program code embodied therewith, the computer readable program code comprising: computer readable program code configured to control, responsive to receipt of an indicator, a hard disk drive assembly of an apparatus, the hard disk drive assembly including one or more heads and one or more platters, said controlling comprising: placing the one or more heads in a persist unload heads state in which the one or more heads: temporarily park; and perform one of limited reading and limited writing of buffered requests responsive to one or more predetermined conditions.

A still further aspect provides an apparatus comprising: one or more platters; one or more heads configured to read and write data from the one or more platters; and a drive controller configured to control said hard disk drive assembly; wherein, responsive to an indicator, the one or more heads are configured to be placed in a persist unload heads state in which the one or more heads: temporarily park; and perform one of limited reading and limited writing of buffered requests responsive to one or more predetermined conditions.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1B:
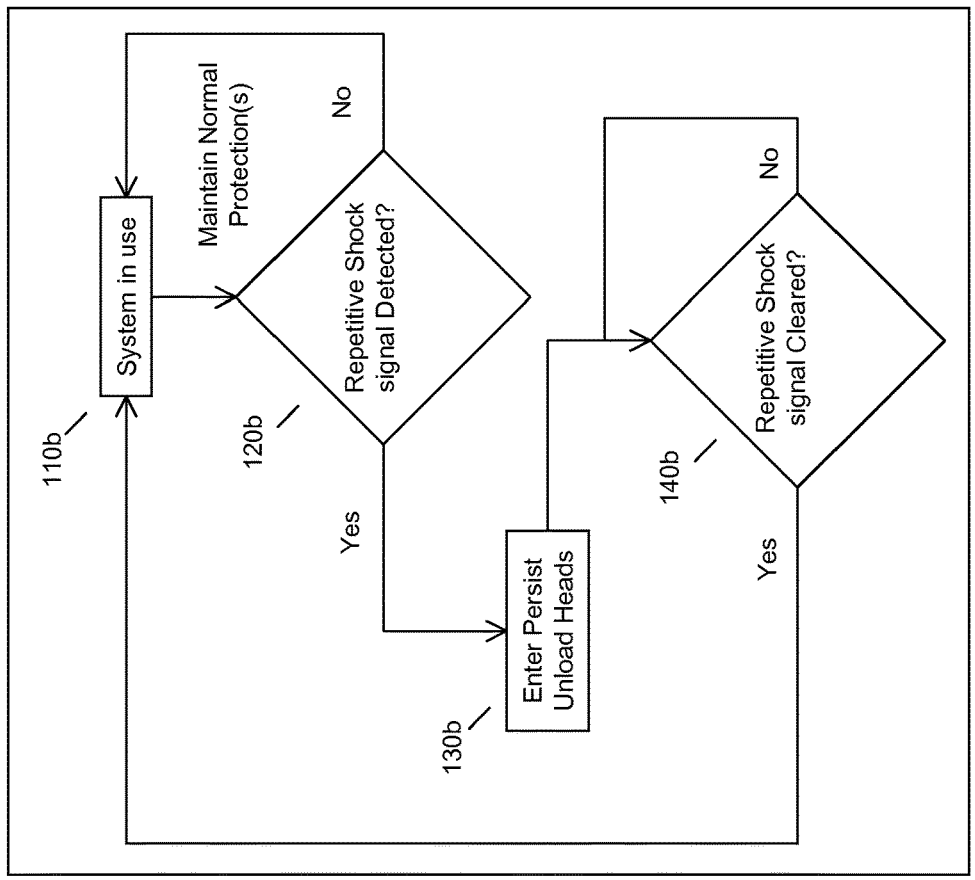
FIG. 1A-B illustrate examples of entering and exiting a modified HDD state.

It will be readily understood that the components of the embodiments, as generally described and illustrated in the figures herein, may be arranged and designed in a wide variety of different configurations in addition to the described example embodiments. Thus, the following more detailed description of example embodiments, as represented in the figures, is not intended to limit the scope of the claims, but is merely representative of those example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

Current solutions for unexpected impact damage prevention include systems optimized for in-use contexts. An in-use context includes for example a scenario where a user is actively using a system, such as a notebook computer, resting in a relatively stable position, such as on a desk, table top, or on the user's lap. Currently, these solutions use a motion sensor such as an accelerometer to detect sudden acceleration indicating that a system is falling and an impact is imminent. When this is detected, current solutions continuously issue a command ("unload heads") to the hard disk drive (HDD) assembly. This causes the heads to be parked; thereby preventing them from "slapping" the disk platters during an impact and preventing damage to the HDD. Such solutions work well under certain operational contexts, for example, while users are actively using their computer in a relatively stable resting position.

Current solutions are designed to maintain performance during system use, as the heads are parked only when necessary to avoid damage. That is, these solutions do not unload the head unless it is deemed necessary responsive to detecting acceleration indicating an imminent impact, providing the protection only in response to a drop being detected. This is accomplished by repeatedly issuing the unload heads command in response to detection of an acceleration indicating impending impact. The repeated sending of the unload heads command is necessitated because when the HDD receives another command (for example, to read or write), such as is commonly encountered while the system is being used, the HDD will respond to that command to optimize performance, clearing the unload heads command.

In a "repetitive shock" context, such as on a train where the resting position of the notebook computer is not relatively stable, these accelerometer-based protection systems essentially shut off. Thus, if the accelerometer continually detects possible drop accelerations, such as could be encountered when using the system on a train, the accelerometer-based system enters a repetitive shock mode and leaves the HDD unprotected.

Moreover, current solutions require waiting for the accelerometer-based detection mechanism to respond to an aberrant acceleration indicating imminent impact. While accelerometer-based protection has proven reliable and quickly responsive, for shorter falls where impact almost immediately follows any detectable acceleration, any delay may be problematic. Nonetheless, for most system in-use contexts, such accelerometer-based solutions tend work well and are optimized to maintain performance.

The inventors have recognized, however, that current protection systems are inadequate for certain use contexts where HDD protection can be ensured in favor of system performance. These contexts include at least temporary system non-use contexts and repetitive shock contexts.

In a temporary system non-use context the system encounters a period of non-use, yet the system is not shut down. As an example of a temporary non-use context, it often occurs that a user closes the lid of the system and the closed lid action is set to do nothing. In such a temporary system non-use context, HDD protection can take a higher priority than system performance.

As above, in repetitive shock contexts, if the accelerometer continually detects possible drop accelerations, such as could be encountered when using the system on a train, the accelerometer-based system essentially turns itself off, leaving the HDD unprotected. Thus, current solutions are not configured to take advantage of temporary system non-use states and/or offer adequate protection when repetitive shock use environments are encountered.

Accordingly, certain embodiments are configured to take an indicator as input for initiating a modified HDD state. The modified HDD state is referred to herein as a "persist unload heads state". The modified HDD state corresponds to a state wherein the heads of are parked as a baseline setting, but permitted to float over the platters for completing requests (for example, reads and/or writes) on a limited basis. This prioritizes HDD protection (parked heads) over system performance (completion of requests). As an example indicator, an indicator of temporary system non-use can be used for initiating a modified HDD state, such as responsive to a lid of a notebook computer being closed, with system lid close action set to do nothing. As another example of an indicator, a user may provide input indicating when a modified HDD state should be initiated, such as in a repetitive shock context. Thus, an indicator as described herein may be issued manually or be issued automatically in response to some measurable event(s).

A system configured for handling contexts in which HDD protection is to be prioritized and performance considerations are secondary has several distinct features. For example, repeated issuing of unload head commands can be avoided, as the system need not read or write, at least temporarily. Moreover, the system can be maintained in a persist unload heads state such that reliance on an accelerometer-based protection system is reduced. This can prove useful in a variety of contexts such as for example when short fall situations are encountered or when accelerometer-based solutions exhibit reduced effectiveness, such as a repetitive shock context.

It should be noted throughout this description that additional system protections, such as an accelerometer-based protection system, can remain active to protect the system while in use and work in concert with the example embodiments providing a modified HDD state, as described herein.

The illustrated embodiments will be best understood by reference to the figures. The following description is intended only by way of example, and simply illustrates certain example embodiments.

Figure 1A:
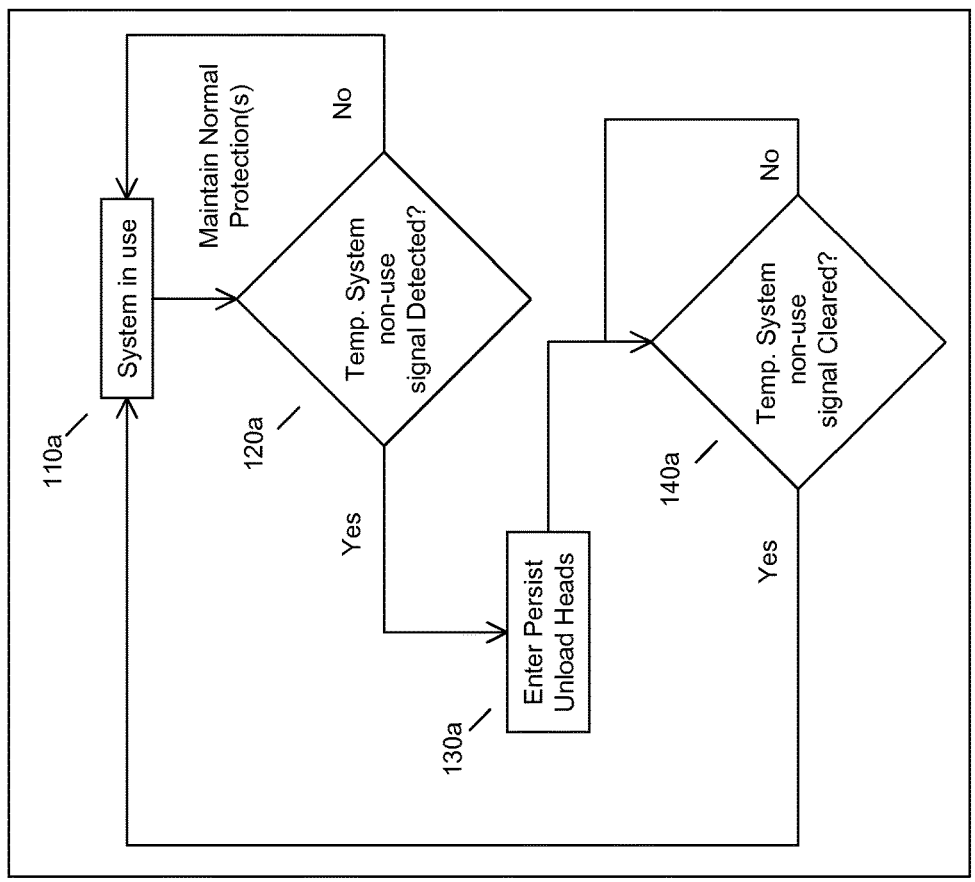

Turning now to FIG. 1A, an example method of entering and exiting a persist unload heads state is illustrated. For certain embodiments, a modified HDD state, persist unload heads state, provides that the nominal state of the heads is the parked or unloaded position, instead of floating over the platters (which would be consistent with accelerometer-based protection systems). The system, for example a client device such as a laptop or notebook computer system, is initially in use 110a. Such a state corresponds for example to a full power state, such as when a user is actively using the system.

At 120a it is determined if a temporary system non-use signal is detected. If it is determined at 120a that a temporary system non-use signal has been detected, the system can enter 130a the persist unload heads state. This persist unload heads state could be entered in response to a predefined temporary system non-use condition being satisfied. For example, a temporary system non-use signal could be issued when the operating system lid close action is set to not suspend the system (do nothing) and the lid is closed. Additional criteria, for example, the system running on battery power, or no external cables (video, Ethernet, et cetera) connected, could be utilized as a predefined condition, responsive to which an indicator/signal is issued, as described further herein.

In a lid close scenario, for example, it is likely that the user is going to carry the system (for example, from an office to a meeting) without shutting the system down. Currently, accelerometer-based systems will try to protect the HDD from damage if the user were to drop the system. However, there is no real need to wait for the accelerometer-based detection to unload the heads responsive to aberrant acceleration; as such a temporary non-use condition is an opportunity to change the HDD operating mode to the persist unload heads state proactively.

While in this persist unload heads state, the heads would move over the platters in a limited fashion when needed. For example, predefined conditions can be set such that the heads remain temporarily in the parked condition until movement over the platters is necessary. Such predefined conditions can include, by way of example, when a read command has been delayed for a predetermined period of time or a buffer associated with a head is filled to some predetermined amount. When a predetermined condition is satisfied, the heads can float or move over the platters as necessary to perform various functions, such as reading and writing, and thereafter return to the parked state until the predefined condition(s) have again been met or the persist unload heads state has been cleared.

While in the persist unload heads state, it can be determined that a command has issued to clear the temporary system non-use signal at 140a. For example, once the user opens the lid and/or pushes a button to resume, indicating that they have reached their destination and wish to resume using the system, a signal can be sent clearing the temporary non-use indicator, which in turn causes the HDD to return to a normal operating mode.

Referring now to FIG. 1B, the indicator can include for example an indicator signaling a repetative shock context. As an example, while the system is in use 110b, a repetative shock signal may be issued. The repetitive shock signal may be issued in response to an explicit user action, such as a button press or other interface action with the system, or could include an automated detection based on an accelerometer.

If the repetitive shock signal is detected 120b, the system can enter the persist unload heads state 130b. Again, this state corresponds to an HDD protection mode in which the heads are temporarily parked and given limited freedom to float over the platters to perform reads and writes, as described herein. Responsive to the repetitive shock signal being cleared 140b, such as by a user interfacing with the system, the system can return to the in use state. In this context, the in use state can correspond to an in use state wherein a repetitive shock context is no-longer encountered and/or increased system performance is desirable.

Figure 2B:
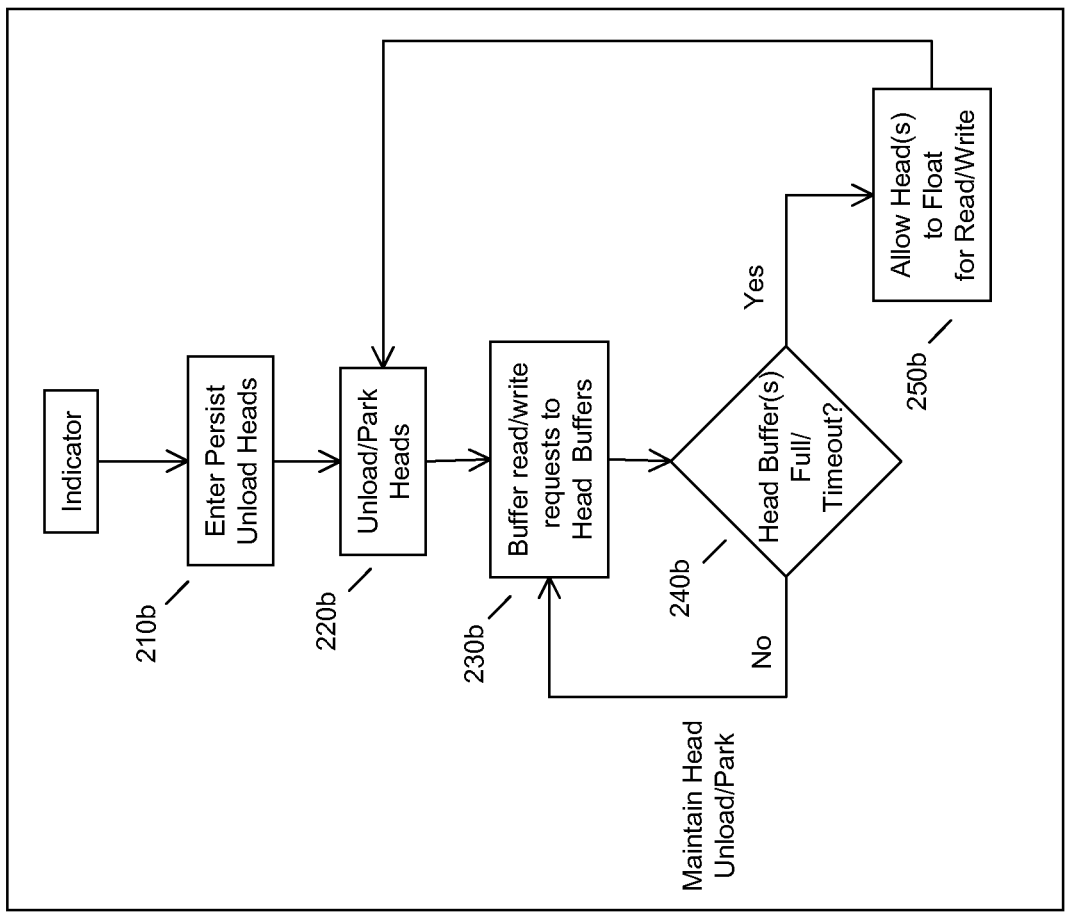
FIG. 2B illustrates example system operations of a modified HDD state.
Figure 2A:
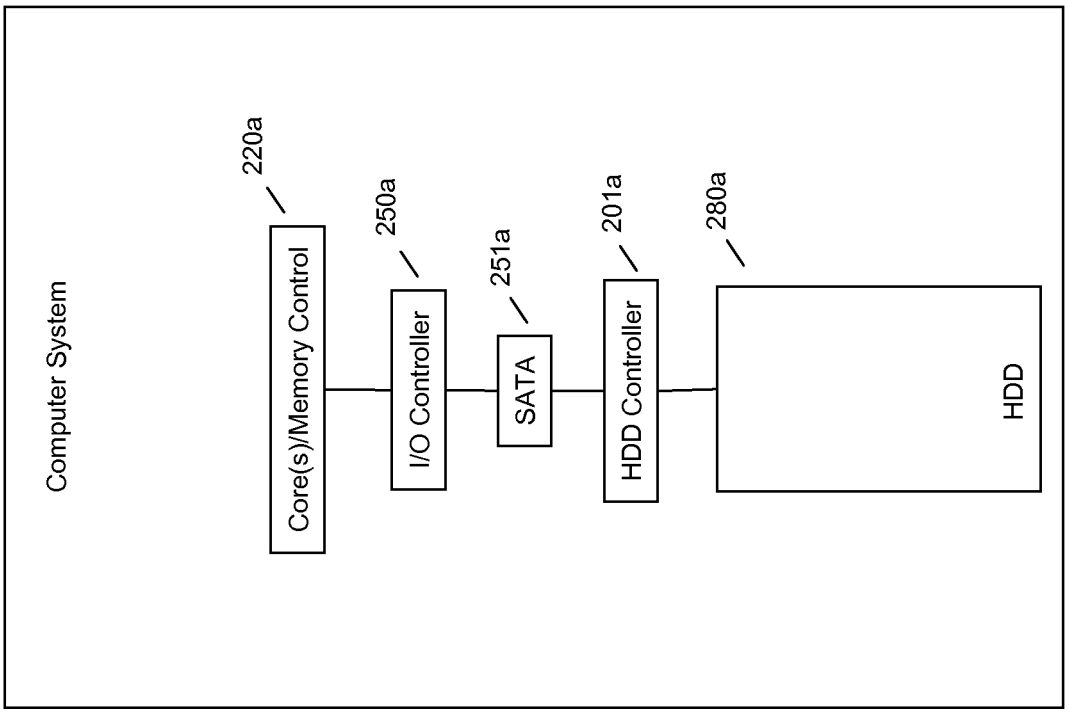
FIG. 2A illustrates an example of a computer system having a modified HDD controller.

Turning to FIG. 2A, an example of a computer system having a modified HDD controller is illustrated. By way of non-limiting example, receipt of the indicators/signals for entry into and exit from the persist unload heads state, and read/write request management while in the persist unload head state, as described herein, may implemented by employing a modified HDD controller 201a. The modified HDD controller 201a can be implemented as part of an assembly to control a HDD 280a, including head(s) for reading to and writing from one or more platters of the HDD 280a of a computer system consistent with the example embodiments described herein. The modified HDD controller 201a is operatively connected to the HDD 280a, and an interface (for example SATA 251a) communicatively coupled to an I/O controller 250a and core(s) memory control 220a, which as described herein may include one or more processors.

As an example, the modified HDD controller 201a is configured to detect an indicator for entering into and/or exiting from the persist unload heads state, such as communicated from core(s) memory control 220a, responsive to an application issued signal. An indicator, as described herein, can be issued from a user explicitly, or issued automatically via an application, such as a power management application, responsive to one or more measurable event(s) being detected. As an example, a power management application can be modified to issue a persist unload heads indicator via the core(s) memory control 220a responsive to a lid closure. As another example, repetitive accelerations indicating a repetitive shock use context, as detected by an accelerometer, can cause an application to issue an indicator.

Turning to FIG. 2B, example system operations while in the persist unload heads state are illustrated. As above, an indicator can be received indicating the system should enter the persist unload heads state. Again, this indicator can be issued manually or be an automated indicator issued responsive to a measurable event indicating that increased HDD protection is desirable.

At 210b the system enters into the persist unload state. Responsive to the entry of the persist unload heads state, the system temporarily unloads/parks the heads 220b. This places the heads in a state in which they are not free to move or float about the platters, but rather buffer data while parked. Such a condition is consistent with a protected HDD condition because an impact, such as a user inadvertently dropping the system, is not likely to cause an impact between the heads and the platters.

While the heads are temporarily parked in the persist unload heads, read and/or write requests normally carried out by the heads are buffered 230b in buffers associated with the heads. Depending on the amount of information/data to be buffered and/or the length of time the system stays in the persist unload heads state, the buffers may fill to a predetermined level or a timeout may be reached. If it is determined that a buffer has filled to a predetermined level 240b, the head(s) are permitted to briefly move or float about the platters for a predetermined time. The predetermined time the head(s) are permitted to float and perform functions can be defined in any number of ways, such as the time necessary to clear a certain amount of buffered data/commands/requests, the time necessary to respond to a given request, and/or a fixed time.

Certain embodiments can be configured to take into account a timeout period at 240b in addition to or in lieu of a buffer filled determination. For example, responsive to a read request, certain embodiments are configured to only delay the read request a predetermined time, subsequent to which a timeout is reached and the data is read.

Responsive to permitting the heads to float for handling read/write requests 250b, the heads are again parked so as to maximize the time spent parked while the persist unload heads state is maintained. The persist unload heads state can, as described herein, be cleared through receipt of an appropriate signal/command. As one having ordinary skill in the art will readily understand, exiting consistency schemes for maintaining read/write consistency of the buffered data/requests can be implemented in the persist unload heads state, as described herein, in order to ensure consistency of the system in this regard.

It will be understood by those having ordinary skill in the art that embodiments can be implemented with electronic devices having appropriately configured circuitry, such as a desktop or laptop computer system, and the like. A non-limiting example of a computer system is described below.

The term "circuit" or "circuitry" as used herein includes all levels of available integration, for example, from discrete logic circuits to the highest level of circuit integration such as VLSI, and includes programmable logic components programmed to perform the functions of an embodiment as well as general-purpose or special-purpose processors programmed with instructions to perform those functions.

Figure 3:
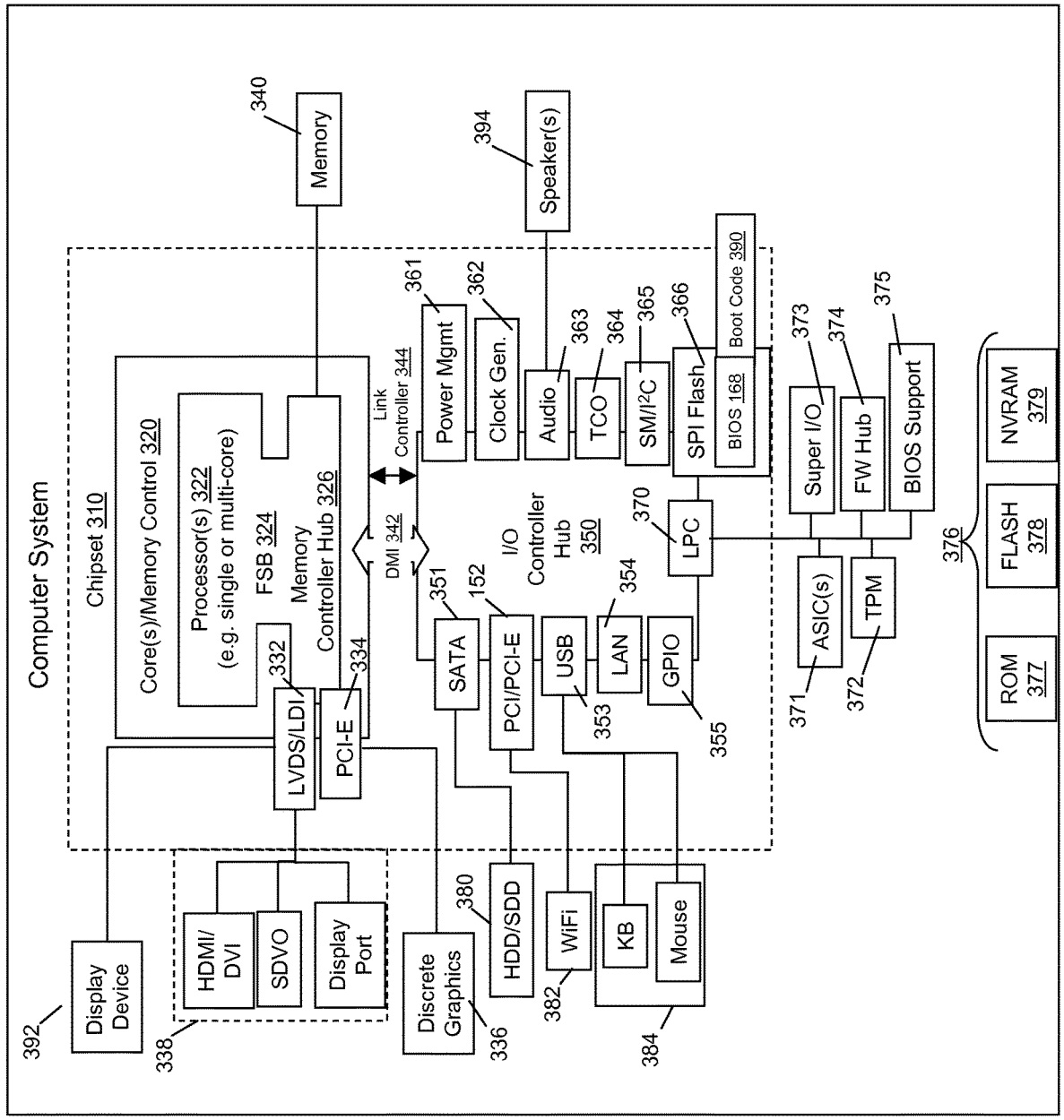
FIG. 3 illustrates an example computer system.

While various other circuits or circuitry may be utilized, FIG. 3 depicts a block diagram of one example of a computer system and circuitry. The system may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system illustrated in FIG. 3.

The computer system of FIG. 3 includes a so-called chipset 310 (a group of integrated circuits, or chips, that work together, chipsets) with an architecture that may vary depending on manufacturer (for example, INTEL®, AMD®, etc.). The architecture of the chipset 310 includes a core and memory control group 320 and an I/O controller hub 350 that exchange information (for example, data, signals, commands, et cetera) via a direct management interface (DMI) 342 or a link controller 344. In FIG. 3, the DMI 342 is a chip-to-chip interface (sometimes referred to as being a link between a "northbridge" and a "southbridge"). The core and memory control group 320 include one or more processors 322 (for example, single or multi-core) and a memory controller hub 326 that exchange information via a front side bus (FSB) 324; noting that components of the group 320 may be integrated in a chip that supplants the conventional "northbridge" style architecture.

In FIG. 3, the memory controller hub 326 interfaces with memory 340 (for example, to provide support for a type of RAM that may be referred to as "system memory"). The memory controller hub 326 further includes a LVDS interface 332 for a display device 392 (for example, a CRT, a flat panel, a projector, et cetera). A block 338 includes some technologies that may be supported via the LVDS interface 332 (for example, serial digital video, HDMI/DVI, display port). The memory controller hub 326 also includes a PCI-express interface (PCI-E) 334 that may support discrete graphics 336.

In FIG. 3, the I/O hub controller 350 includes a SATA interface 351 (for example, for HDDs, SDDs, et cetera), a PCI-E interface 352 (for example, for wireless connections 382), a USB interface 353 (for example, for input devices 384 such as keyboard, mice, cameras, phones, storage, et cetera), a network interface 354 (for example, LAN), a GPIO interface 355, a LPC interface 370 (for ASICs 371, a TPM 372, a super I/O 373, a firmware hub 374, BIOS support 375 as well as various types of memory 376 such as ROM 377, Flash 378, and NVRAM 379), a power management interface 361, a clock generator interface 362, an audio interface 363 (for example, for speakers 394), a TCO interface 164, a system management bus interface 365, and SPI Flash 366, which can include BIOS 368 and boot code 390. The I/O hub controller 350 may include gigabit Ethernet support.

The system, upon power on, may be configured to execute boot code 390 for the BIOS 368, as stored within the SPI Flash 366, and thereafter processes data under the control of one or more operating systems and application software (for example, stored in system memory 340). An operating system may be stored in any of a variety of locations and accessed, for example, according to instructions of the BIOS 368. As described herein, a device may include fewer or more features than shown in the system of FIG. 3.

Furthermore, embodiments may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In this description, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations may be written in any combination of one or more programming languages (including an object oriented programming language such as Java™, Smalltalk, C++ or the like and conventional procedural programming languages, such as the "C" programming language or similar programming languages). The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described herein with reference to flow-chart illustrations and/or block diagrams of methods, apparatuses, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a programmable data processing apparatus to produce a machine, such that the instructions, which execute via the processor, create means for implementing the functions/acts specified in the flowchart and/or block diagram block or blocks.

These computer program instructions may also be stored in a computer readable medium that can direct a computer or other devices to function in a particular manner, such that the instructions stored in the computer readable medium produce an article of manufacture including instructions which implement the function/act specified in the flowchart and/or block diagram block or blocks.

The computer program instructions may also be loaded onto a computer or other devices to cause a series of operational steps to be performed on the computer or other devices to produce a computer implemented process such that the instructions which execute on the computer or other device provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrative example embodiments have been described herein with reference to the accompanying drawings, it is to be understood that the embodiments are not limited to those precise descriptions, and that various other changes and modifications may be affected therein by one skilled in the art without departing from the scope or spirit of the disclosure.

What is claimed is:

1. An apparatus comprising:
   one or more processors;
   a display which displays output generated by the one or more processors; and
   a hard disk drive assembly operatively connected to the one or more processors, the hard disk drive assembly comprising:
   one or more platters;
   one or more heads configured to read and write data from the one or more platters; and
   a drive controller configured to control said hard disk drive assembly;
   wherein, responsive to detecting a repetitive shock signal, the one or more heads are configured to be placed in a persist unload heads state in which the one or more heads:
   are parked as a baseline setting but are permitted to float over the one or more platters for completing buffered requests, during a time period that the repetitive shock signal is detected and while maintaining a power supply to the hard disk drive, responsive to identifying that buffers holding the buffered requests are filled to a predetermined level;
   the completing requests including performing one or more of limited reading and limited writing of the buffered requests to clear a predetermined amount of the buffered requests and while maintaining the power supply to the hard disk drive.

2. The apparatus according to claim 1, further comprising an accelerometer, wherein the accelerometer is configured to detect one or more accelerations indicating imminent impact and issue an indicator of impending impact.

3. The apparatus according to claim 1, wherein the apparatus comprises a notebook computer.

4. A method comprising:
   controlling, responsive to detecting a repetitive shock signal, a hard disk drive assembly of an apparatus, the hard disk drive assembly including one or more heads and one or more platters, said controlling comprising:
   placing the one or more heads in a persist unload heads state in which the one or more heads:
   are parked as a baseline setting but are permitted to float over the one or more platters for completing buffered requests, during a time period that the repetitive shock signal is detected and while maintaining a power supply to the hard disk drive, responsive to identifying that buffers holding the buffered requests are filled to a predetermined level;
   the completing requests including performing one or more of limited reading and limited writing of the buffered requests to clear a predetermined amount of the buffered requests and while maintaining the power supply to the hard disk drive.

5. The method according to claim 4, further comprising detecting one or more accelerations indicating imminent impact via an accelerometer and issuing an indicator of impending impact.

6. A computer program product comprising:
   a computer readable storage device having computer readable program code embodied therewith, the computer readable program code comprising:
   computer readable program code configured to control, responsive to detecting a repetitive shock signal, a hard disk drive assembly of an apparatus, the hard disk drive assembly including one or more heads and one or more platters, said controlling comprising:
   placing the one or more heads in a persist unload heads state in which the one or more heads:
   are parked as a baseline setting but are permitted to float over the one or more platters for completing buffered requests, during a time period that the repetitive shock signal is detected and while maintaining a power supply to the hard disk drive, responsive to identifying that buffers holding the buffered requests are filled to a predetermined level;
   the completing requests including performing one or more of limited reading and limited writing of the buffered requests to clear a predetermined amount of the buffered requests and while maintaining the power supply to the hard disk drive.

7. An apparatus comprising:
   one or more platters;
   one or more heads configured to read and write data from the one or more platters; and
   a drive controller configured to control said one or more heads;
   wherein, responsive to detecting a repetitive shock signal, the one or more heads are configured to be placed in a persist unload heads state in which the one or more heads:
   are parked as a baseline setting but are permitted to float over the one or more platters for completing buffered requests, during a time period that the repetitive shock signal is detected and while maintaining a power supply to the hard disk drive, responsive to identifying that buffers holding the buffered requests are filled to a predetermined level;
   the completing requests including performing one or more of limited reading and limited writing of the buffered requests to clear a predetermined amount of the buffered requests and while maintaining the power supply to the hard disk drive.

* * * * *